United States Patent
Miceli

(10) Patent No.: US 8,139,923 B2
(45) Date of Patent: Mar. 20, 2012

(54) PLAYBACK OF RECORDED STREAMING DELTA-ENCODED DATA

(75) Inventor: Sean Miceli, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 1036 days.

(21) Appl. No.: 12/051,430

(22) Filed: Mar. 19, 2008

(65) Prior Publication Data

US 2009/0240708 A1  Sep. 24, 2009

(51) Int. Cl.
*H04N 5/92* (2006.01)

(52) U.S. Cl. .......................................... 386/326

(58) Field of Classification Search .................. None
See application file for complete search history.

(56) References Cited

U.S. PATENT DOCUMENTS

| | | | |
|---|---|---|---|
| 5,764,901 A | 6/1998 | Skarbo et al. | |
| 6,262,776 B1 | 7/2001 | Griffits | |
| 6,337,880 B1 * | 1/2002 | Cornog et al. | 375/240.01 |
| 7,764,863 B1 * | 7/2010 | Strasman et al. | 386/343 |
| 2002/0105951 A1 | 8/2002 | Hannuksela et al. | |
| 2003/0185245 A1 * | 10/2003 | Kang et al. | 370/503 |
| 2004/0207724 A1 | 10/2004 | Crouch et al. | |
| 2004/0230655 A1 | 11/2004 | Li et al. | |
| 2005/0177643 A1 * | 8/2005 | Xu | 709/231 |
| 2007/0088782 A1 | 4/2007 | Ludwig et al. | |
| 2007/0147406 A1 * | 6/2007 | Perlman et al. | 370/412 |
| 2008/0307482 A1 * | 12/2008 | Dandekar et al. | 725/131 |

OTHER PUBLICATIONS

US 5,715,404, 2/1998, Katseff et al. (withdrawn).

* cited by examiner

*Primary Examiner* — Nasser Goodarzi
*Assistant Examiner* — Kendall Dolly

(57) ABSTRACT

Apparatus having corresponding methods and computer-readable media comprise a circuit adapted to receive a seek time for a first stream of delta-encoded data stored in a stream file; a circuit adapted to select an index time based on the seek time, and adapted to retrieve an index pointer associated with the index time from an index file, wherein the index file includes a plurality of the index times and index pointers each associated with one of the index times; a circuit adapted to select an intraframe based on the index pointer, and adapted to retrieve the intraframe, and a frame pointer associated with the intraframe, from a frame file, wherein the frame file includes a plurality of the intraframes and frame pointers; and an output circuit adapted to transmit a second stream of delta-encoded data based on the intraframe and the delta-encoded data stored in the stream file.

24 Claims, 5 Drawing Sheets

PLAYBACK OF RECORDED STREAMING DELTA-ENCODED DATA

CROSS REFERENCE TO RELATED APPLICATIONS

This application is also related to application Ser. No. 12/050,526, filed Mar. 18, 2008.

BACKGROUND

The present disclosure relates generally to the processing of streaming delta-encoded data, and more particularly to the playback of recorded streaming delta-encoded data.

Various compression techniques have been developed to enable efficient transmission of data streams such as video streams. One family of these compression techniques is referred to as delta encoding. In delta encoding, after encoding and transmitting a complete picture, referred to as an intraframe or I Frame, only the differences between subsequent pictures are encoded and transmitted. These differences are referred to as interframes, and in various compression protocols include predicted frames (P Frames), Bi-predictive frames (B Frames), and the like.

Different transport-layer protocols can be used to transport packets of delta-encoded data. For example, User Datagram Protocol (UDP) can be used. But because UDP does not guarantee reliability or ordering, it is necessary to transmit I Frames frequently in order to supply data missing due to lost frames. The use of UDP also poses significant security risks. Therefore UDP packets are generally not permitted to traverse the network firewalls employed by most businesses, rendering UDP unsuitable for business communications.

Another transport-layer protocol that can be used to transport packets of delta-encoded data is Transmission Control Protocol (TCP). Because TCP provides reliable, in-order delivery of packets, it does not pose the security issues associated with UDP. In addition, it is only necessary to transmit one I Frame at the beginning of each stream of delta-encoded data.

SUMMARY

In general, in one aspect, an embodiment features an apparatus comprising: a seek circuit adapted to receive a seek time for a first stream of delta-encoded data stored in a stream file; a playback index circuit adapted to select an index time based on the seek time, and adapted to retrieve an index pointer associated with the index time from an index file, wherein the index file includes a plurality of the index times and index pointers each associated with one of the index times; a playback frame circuit adapted to select an intraframe based on the index pointer, and adapted to retrieve the intraframe, and a frame pointer associated with the intraframe, from a frame file, wherein the frame file includes a plurality of the intraframes and frame pointers; and an output circuit adapted to transmit a second stream of delta-encoded data based on the intraframe and the delta-encoded data stored in the stream file following a location indicated by the frame pointer.

Embodiments of the apparatus can include one or more of the following features. Some embodiments comprise a frame generation circuit adapted to generate a frame based on the intraframe and the delta-encoded data in the stream file located between the index time and the seek time; wherein the output circuit transmits the frame followed by the delta-encoded data in the stream file following the seek time. In some embodiments, the output circuit transmits the intraframe followed by the delta-encoded data in the stream file following the index time. In some embodiments, each stream of delta-encoded data includes a plurality of packets of video data. In some embodiments, the video data complies with at least one of: one or more of the Video Coding Experts Group (VCEG) standards; and one or more of the Moving Picture Experts Group (MPEG) standards. In some embodiments, each stream of delta-encoded data includes a plurality of real-time protocol (RTP) packets, wherein each RTP packet includes at least a portion of one the packets of the video data; and wherein the output circuit transmits the RTP packets. In some embodiments, each of the RTP packets includes a timestamp and a sequence number, and the output circuit comprises: a timestamp circuit adapted to modify the timestamps of the RTP packets following the location in the stream file indicated by the second pointer before transmitting the RTP packets; and a sequence circuit adapted to modify the sequence numbers of the RTP packets following the location in the stream file indicated by the second pointer before transmitting the RTP packets. In some embodiments, the output circuit transmits the RTP packets using transmission control protocol/Internet protocol (TCP/IP).

In general, in one aspect, an embodiment features an apparatus comprising: seek means for receiving a seek time for a first stream of delta-encoded data stored in a stream file; playback index means for selecting an index time based on the seek time, and for retrieving an index pointer associated with the index time from an index file, wherein the index file includes a plurality of the index times and index pointers each associated with one of the index times; playback frame means for selecting an intraframe based on the index pointer, and for retrieving the intraframe, and a frame pointer associated with the intraframe, from a frame file, wherein the frame file includes a plurality of the intraframes and frame pointers; and output means for transmitting a second stream of delta-encoded data based on the intraframe and the delta-encoded data stored in the stream file following a location indicated by the frame pointer.

Embodiments of the apparatus can include one or more of the following features. Some embodiments comprise frame generation means for generating a frame based on the intraframe and the delta-encoded data in the stream file located between the index time and the seek time; wherein the output means transmits the frame followed by the delta-encoded data in the stream file following the seek time. In some embodiments, the output means transmits the intraframe followed by the delta-encoded data in the stream file following the index time. In some embodiments, each stream of delta-encoded data includes a plurality of packets of video data. In some embodiments, the video data complies with at least one of: one or more of the Video Coding Experts Group (VCEG) standards; and one or more of the Moving Picture Experts Group (MPEG) standards. In some embodiments, each stream of delta-encoded data includes a plurality of real-time protocol (RTP) packets, wherein each RTP packet includes at least a portion of one of the packets of the video data; and wherein the output means transmits the RTP packets. In some embodiments, each of the RTP packets includes a timestamp and a sequence number, and the output means comprises: timestamp means for modifying the timestamps of the RTP packets following the location in the stream file indicated by the second pointer before transmitting the RTP packets; and sequence means for modifying the sequence numbers of the RTP packets following the location in the stream file indicated by the second pointer before transmitting the RTP packets. In some embodiments, the output means transmits the RTP packets using transmission control protocol/Internet protocol (TCP/IP).

In general, in one aspect, an embodiment features computer-readable media embodying instructions executable by a computer to perform a method comprising: receiving a seek time for a first stream of delta-encoded data stored in a stream file; selecting an index time based on the seek time; retrieving an index pointer associated with the index time from an index file, wherein the index file includes a plurality of the index times and index pointers each associated with one of the index times; selecting an intraframe based on the index pointer; retrieving the intraframe, and a frame pointer associated with the intraframe, from a frame file, wherein the frame file includes a plurality of the intraframes and frame pointers; and causing transmission of a second stream of delta-encoded data based on the intraframe and the delta-encoded data stored in the stream file following a location indicated by the frame pointer.

Embodiments of the computer-readable media can include one or more of the following features. In some embodiments, the method further comprises: generating a frame based on the intraframe and the delta-encoded data in the stream file located between the index time and the seek time; and causing transmission of the frame followed by the delta-encoded data in the stream file following the seek time. In some embodiments, the method further comprises: causing transmission of the intraframe followed by the delta-encoded data in the stream file following the index time. In some embodiments, each stream of delta-encoded data includes a plurality of packets of video data. In some embodiments, the video data complies with at least one of: one or more of the Video Coding Experts Group (VCEG) standards; and one or more of the Moving Picture Experts Group (MPEG) standards. In some embodiments, each stream of delta-encoded data includes a plurality of real-time protocol (RTP) packets, wherein each RTP packet includes at least a portion of one of the packets of the video data; and wherein the method further comprises causing transmission of the RTP packets. In some embodiments, each of the RTP packets includes a timestamp and a sequence number, and wherein the output means comprises: timestamp means for modifying the timestamps of the RTP packets following the location in the stream file indicated by the second pointer before transmitting the RTP packets; and sequence means for modifying the sequence numbers of the RTP packets following the location in the stream file indicated by the second pointer before transmitting the RTP packets. In some embodiments, the method further comprises: causing transmission of the RTP packets using transmission control protocol/Internet protocol (TCP/IP).

In general, in one aspect, an embodiment features a method comprising: receiving a seek time for a first stream of delta-encoded data stored in a stream file; selecting an index time based on the seek time; retrieving an index pointer associated with the index time from an index file, wherein the index file includes a plurality of the index times and index pointers each associated with one of the index times; selecting an intraframe based on the index pointer; retrieving the intraframe, and a frame pointer associated with the intraframe, from a frame file, wherein the frame file includes a plurality of the intraframes and frame pointers; and causing transmission of a second stream of delta-encoded data based on the intraframe and the delta-encoded data stored in the stream file following a location indicated by the frame pointer.

Embodiments of the method can include one or more of the following features. In some embodiments, the method further comprises: generating a frame based on the intraframe and the delta-encoded data in the stream file located between the index time and the seek time; and causing transmission of the frame followed by the delta-encoded data in the stream file following the seek time. In some embodiments, the method further comprises: causing transmission of the intraframe followed by the delta-encoded data in the stream file following the index time. In some embodiments, each stream of delta-encoded data includes a plurality of packets of video data. In some embodiments, the video data complies with at least one of: one or more of the Video Coding Experts Group (VCEG) standards; and one or more of the Moving Picture Experts Group (MPEG) standards. In some embodiments, each stream of delta-encoded data includes a plurality of real-time protocol (RTP) packets, wherein each RTP packet includes at least a portion of one of the packets of the video data; and wherein the method further comprises causing transmission of the RTP packets. In some embodiments, each of the RTP packets includes a timestamp and a sequence number, and wherein the output means comprises: timestamp means for modifying the timestamps of the RTP packets following the location in the stream file indicated by the second pointer before transmitting the RTP packets; and sequence means for modifying the sequence numbers of the RTP packets following the location in the stream file indicated by the second pointer before transmitting the RTP packets. In some embodiments, the method further comprises: causing transmission of the RTP packets using transmission control protocol/Internet protocol (TCP/IP).

The details of one or more implementations are set forth in the accompanying drawings and the description below. Other features will be apparent from the description and drawings, and from the claims.

Figure 1:
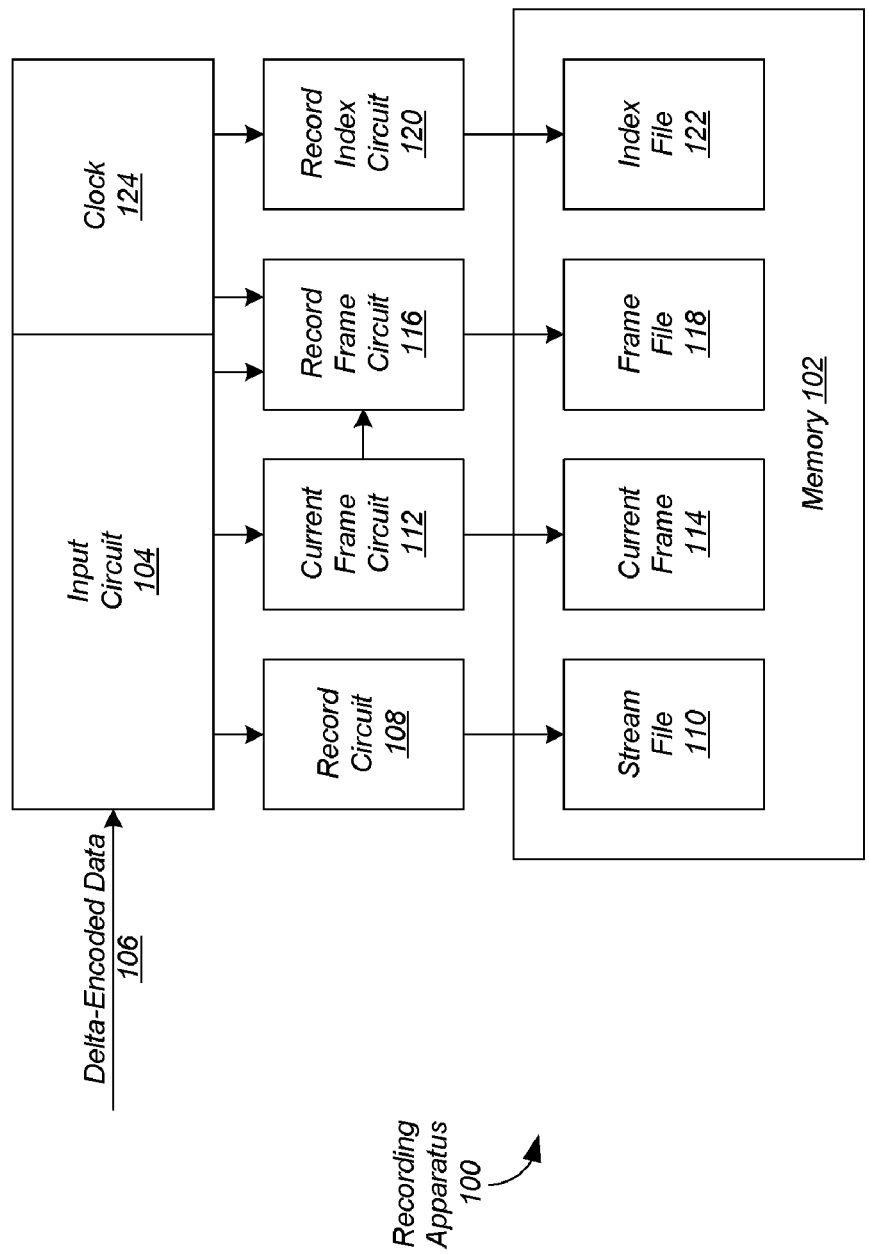
FIG. 1 shows a recording apparatus for recording a stream of delta-encoded data according to one embodiment.

The leading digit(s) of each reference numeral used in this specification indicates the number of the drawing in which the reference numeral first appears.

DETAILED DESCRIPTION

Embodiments of the present invention provide techniques for recording and playback of streaming delta-encoded data. The disclosed techniques enable operations such as seek operations during playback. The streaming delta-encoded data can represent video data such as a video channel of a video conference and the like. The streaming delta-encoded data can be transmitted using protocols such as real-time transport protocol (RTP), transmission control protocol (TCP), Internet protocol (IP), and the like.

Because TCP provides reliable delivery of packets, only one intraframe need be transmitted for each stream of delta-encoded data. The intraframe is transmitted first, and only interframes are required thereafter. While this technique provides very efficient bandwidth usage, it can make some playback operations, such as seek, fast-forward, and rewind, very expensive in terms of processing resources and time required. For example, to seek to a point in a recorded video stream, it would be necessary to process the stream from the beginning in order to process the initial intraframe.

FIG. 1 shows a recording apparatus 100 for recording a stream of delta-encoded data according to one embodiment. Although in the described embodiments, the elements of recording apparatus 100 are presented in one arrangement, other embodiments may feature other arrangements, as will be apparent to one skilled in the relevant arts based on the disclosure and teachings provided herein. For example, the elements of recording apparatus 100 can be implemented in hardware, software, or combinations thereof. In some embodiments, recording apparatus 100 can be used to record a videoconference.

Referring to FIG. 1, recording apparatus 100 includes a memory 102, an input circuit 104 adapted to receive a stream of delta-encoded data 106, a record circuit 108 adapted to store stream 106 in a stream file 110, a current frame circuit 112 adapted to maintain a current frame 114 of the data based on stream 106, a record frame circuit 116 adapted to store current frame 114 in a frame file 118 at a plurality of different index times, and a record index circuit 120 adapted to store the index times sequentially in an index file 122. Recording apparatus 100 can also include a clock 124 to generate a time basis for the index times.

Figure 2:
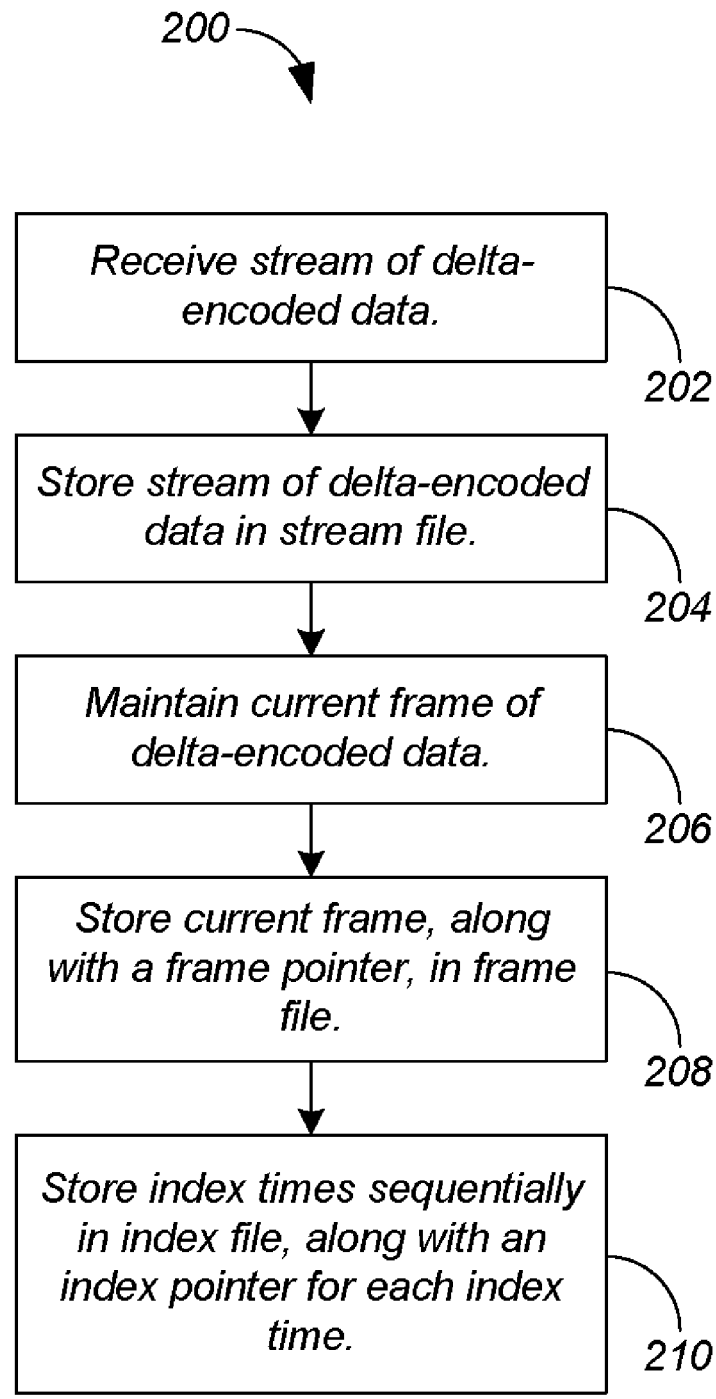
FIG. 2 shows a recording process for the recording apparatus of FIG. 1 according to one embodiment.

FIG. 2 shows a recording process 200 for recording apparatus 100 of FIG. 1 according to one embodiment. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

Referring to FIG. 2, input circuit 104 receives a stream of delta-encoded data 106 (step 202). Record circuit 108 stores the stream of delta-encoded data 106 in stream file 110 (step 204). In some embodiments, delta-encoded data 106 represents packetized video data. That is, delta-encoded data 106 includes a plurality of packets of video data. In these embodiments, record circuit 108 stores the packets in stream file 110. In some embodiments, the video data complies with one or more standards such as the Video Coding Experts Group (VCEG) standards, the Moving Picture Experts Group (MPEG) standards, and the like. For example, the video data can comply with standards such as H.261, H.263, H.264, and the like. In other embodiments, delta-encoded data 106 can represent other sorts of data.

In some embodiments, the stream of delta-encoded data 106 includes a plurality of real-time transport protocol (RTP) packets, where each RTP packet includes at least a portion of one of the packets of the video data. Each RTP packet includes a timestamp and a sequence number. In these embodiments, record circuit 108 stores the RTP packets in stream file 110 in sequence according to the timestamps and/or sequence numbers. The RTP packets can be received using TCP/IP.

Based on the stream of delta-encoded data 106, current frame circuit 112 maintains a current frame 114 of the data 106 (step 206). For example, current frame circuit 112 stores the initial intraframe of the stream as the current frame 114, and then applies the changes represented by the subsequent intraframes of the stream to the current frame 114.

Record frame circuit 116 occasionally stores the current frame 114, along with a frame pointer FP, in frame file 118 (step 208). Record frame circuit 116 can store the current frame 114 at regular intervals, for example every 10 seconds. Of course other intervals can be used. Each of the stored frames is referred to herein as an intraframe IF. The time at which an intraframe IF and the corresponding frame pointer FP are stored is referred to as an index time IT. The index times IT can be calculated as elapsed times from the beginning of reception of the stream of delta-encoded data 106. Each frame pointer FP indicates a location in stream file 110 associated with the respective index time IT.

Record index circuit 120 stores the index times IT sequentially in index file 122, along with an index pointer IP for each index time (step 210). Each index pointer IP indicates the location in frame file 118 of the intraframe IF associated with the respective index time IT.

Figure 3:
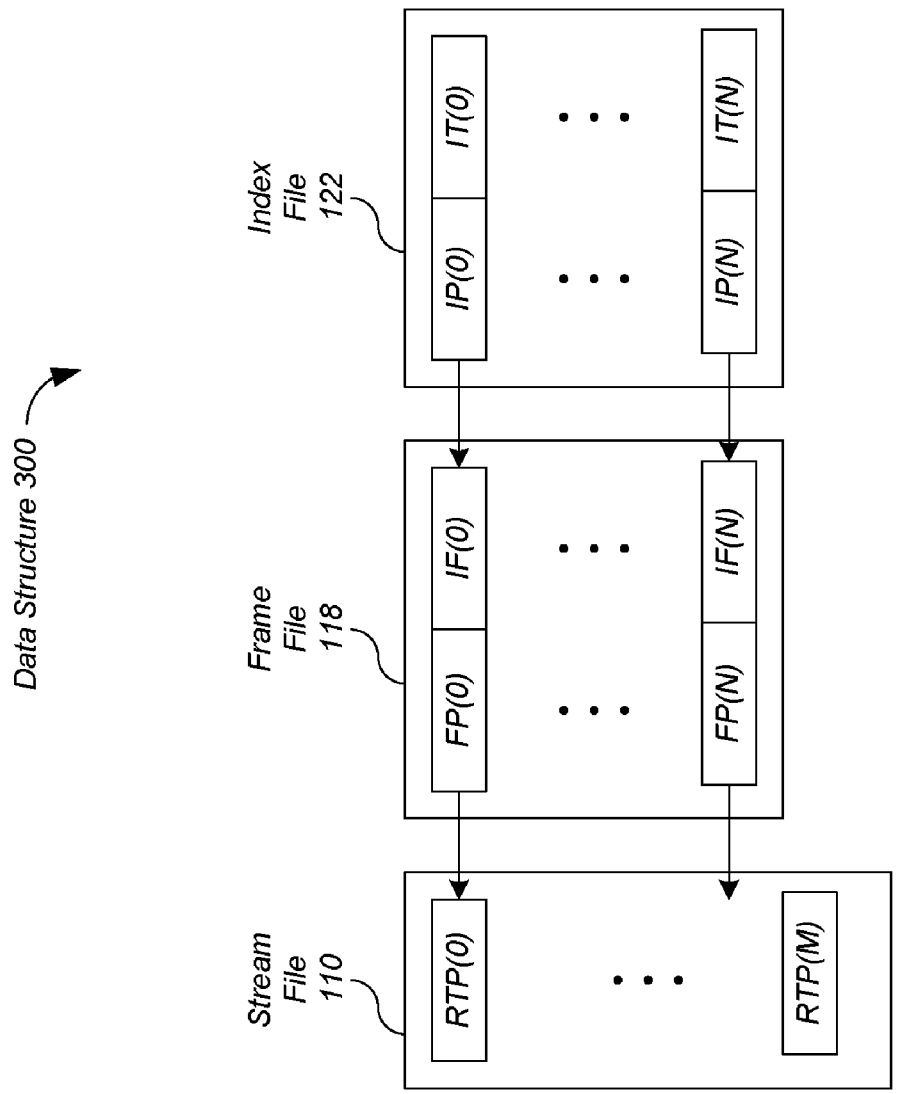
FIG. 3 shows a data structure for storing delta-encoded data according to one embodiment.

FIG. 3 shows a data structure 300 for storing delta-encoded data according to one embodiment. Data structure 300 can be embodied in a computer-readable storage medium. For example, referring to FIG. 1, data structure 300 can be embodied in memory 102. Data structure 300 can be produced by recording apparatus 100 of FIG. 1. Referring again to FIG. 3, data structure 300 includes stream file 110, frame file 118, and index file 122.

Stream file 110 includes a recorded stream of delta-encoded data 106, which can be stored in the form of RTP packets. In FIG. 3, stream file 110 includes M RTP packets labeled RTP(0)-RTP(M) where packet RTP(0) is the first RTP packet in the stream of delta-encoded data 106.

Frame file 118 includes a plurality of intraframes IF each representing the delta-encoded data 106 preceding a different index time IT. Frame file 118 also includes a frame pointer FP for each of the intraframes IF. In FIG. 3, frame file 118 includes N intraframes IF(0)-IF(N), each associated with one of N frame pointers FP(0)-FP(N). Each frame pointer FP indicates a location in stream file 110 for the index time IT corresponding to the respective intraframe IF. For example, the first intraframe (IF) can represent the initial frame of data in the stream of delta-encoded data 106. In that example, intraframe IF(0) is stored at index time IT(0), along with a frame pointer FP(0) that points to the location of the first RTP packet RTP(0) in stream file 110.

Index file 122 includes the index times IT arranged in sequence, and an index pointer IP for each of the index times IT. In FIG. 3, index file 122 includes N index times IT(0)-IT(N), each associated with one of N index pointers IP(0)-IP(N). Each index pointer IP indicates a location in frame file 118 for the intraframe IF corresponding to the respective index time IT. For example, the first index time IT(0) is the time at which the first intraframe IF(0) was generated, so the associated index pointer IP(0) points to the location of intraframe IF(0) in frame file 118.

Figure 4:
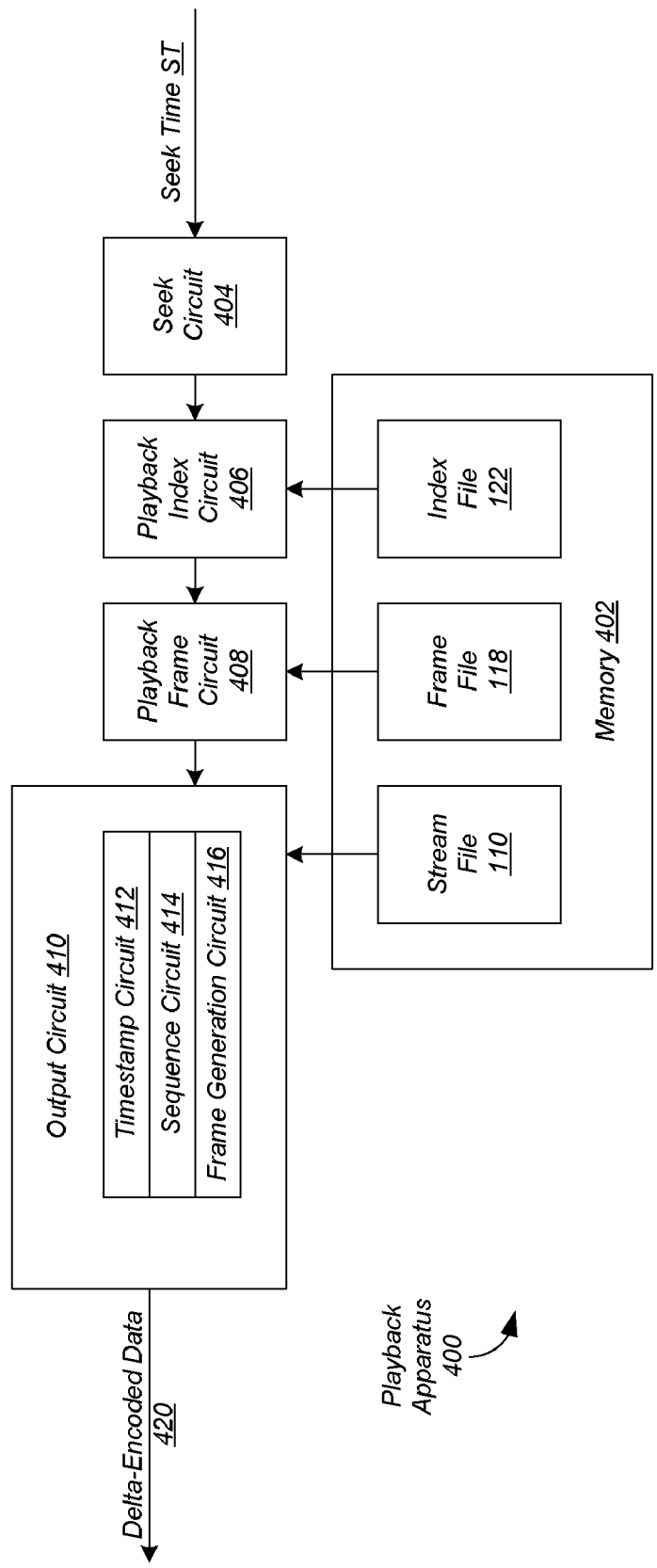
FIG. 4 shows a playback apparatus for playing a recorded stream of delta-encoded data according to one embodiment.

FIG. 4 shows a playback apparatus 400 for playing a recorded stream of delta-encoded data according to one embodiment. Playback apparatus 400 can be used to play back a stream of delta-encoded data 106 stored in the data structure 300 of FIG. 3. Although in the described embodiments, the elements of playback apparatus 400 are presented in one arrangement, other embodiments may feature other arrangements, as will be apparent to one skilled in the relevant arts based on the disclosure and teachings provided herein. For example, the elements of playback apparatus 400 can be implemented in hardware, software, or combinations thereof. In some embodiments, playback apparatus 400 can be used to play a recorded videoconference.

Referring to FIG. 4, playback apparatus 400 includes a memory 402, a seek circuit 404 adapted to receive a seek time ST for a stream of delta-encoded data 106 stored in a stream file 110, a playback index circuit 406 adapted to select an index time IT based on the seek time ST, and adapted to retrieve an index pointer IP associated with the index time IT from an index file 122, a playback frame circuit 408 adapted to select an intraframe IF based on the index pointer IP, and adapted to retrieve the intraframe IF, and a frame pointer FP associated with the intraframe IF, from a frame file 122, and an output circuit 410 adapted to transmit a stream of delta-encoded data 420 based on the intraframe IF and the delta-encoded data 106 stored in stream file 110 following a location indicated by the frame pointer FP.

In some embodiments, output circuit 410 can transmit data in the form of RTP packets, for example as stored in stream file 110 of data structure 300 of FIG. 3. In such embodiments, output circuit 410 can include a timestamp circuit 412 adapted to modify the timestamps of the RTP packets and a sequence circuit 414 adapted to modify the sequence numbers of the RTP packets. In some embodiments, output circuit 410 can include a frame generation circuit 416 adapted to generate a frame based on the intraframe IF and the delta-encoded data 106 in the stream file 110 located between the index time IT and the seek time ST.

Figure 5:
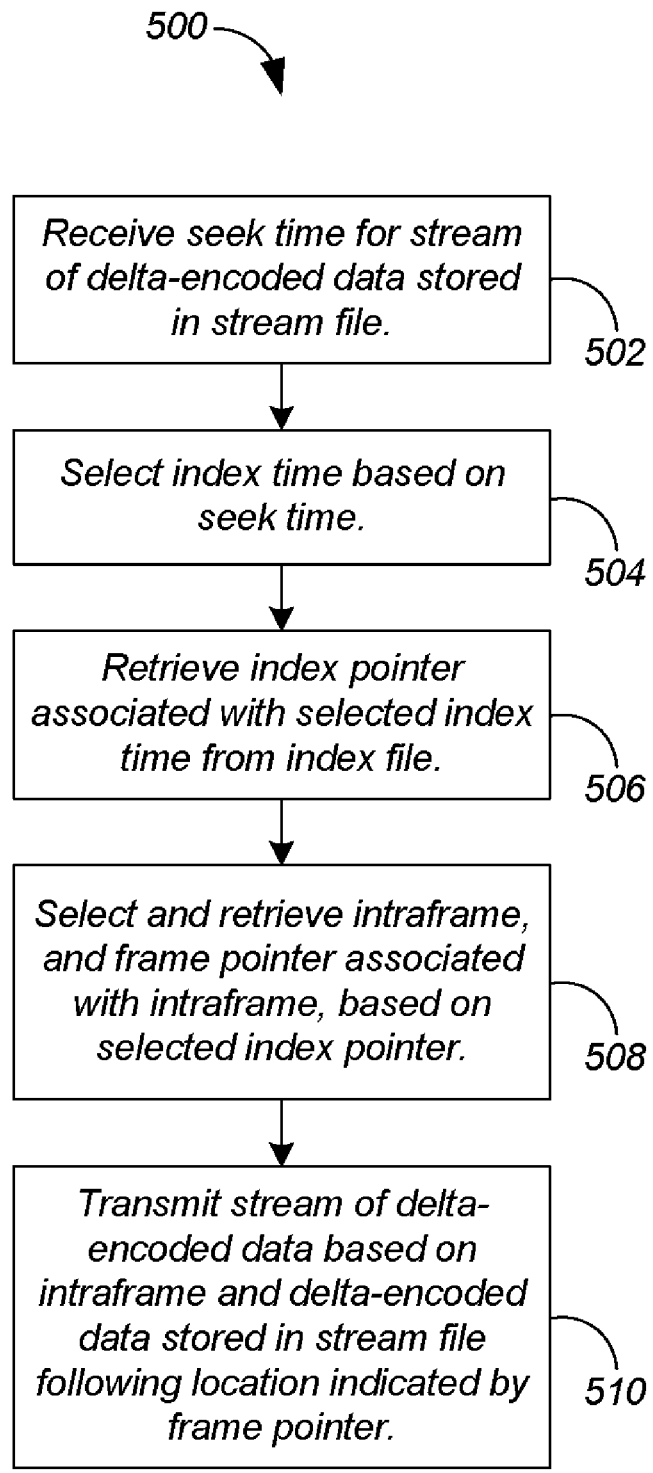
FIG. 5 shows a playback process for the playback apparatus of FIG. 4 according to one embodiment.

FIG. 5 shows a playback process 500 for playback apparatus 400 of FIG. 4 according to one embodiment. Although in the described embodiments, the elements of process 500 are presented in one arrangement, other embodiments may feature other arrangements, as will be apparent to one skilled in the relevant arts based on the disclosure and teachings provided herein. For example, in various embodiments, some or all of the steps of process 500 can be executed in a different order, concurrently, and the like.

Referring to FIG. 5, seek circuit 404 receives a seek time ST for a stream of delta-encoded data 106 stored in stream file 110 (step 502). For example, the seek time can be provided by a user during playback of the stream of delta-encoded data 106.

Playback index circuit 406 selects an index time IT based on the seek time ST (step 504). In some embodiments, the user can be restricted to choosing seek times ST that exactly match the index times IT. In such embodiments, playback index circuit 406 simply uses seek time ST as the index time IT. But in embodiments where the user can choose any seek time ST, playback index circuit 406 can select the index time IT immediately preceding the seek time ST. For example, if the index times IT occur at 10-second intervals and the seek time ST=45 seconds, playback index circuit 406 can select the index time IT(3)=40 seconds.

Playback index circuit 406 retrieves the index pointer IP associated with the selected index time IT from index file 122 (step 506). For example, if the selected index time is IT(3), playback index circuit 406 retrieves the index pointer IP(3).

Playback frame circuit 408 selects and retrieves an intraframe IF, and the frame pointer FP associated with the intraframe IF, based on the selected index pointer IP (step 508). For example, if the selected index pointer is IP(3), playback frame circuit 408 retrieves intraframe IF(3) and frame pointer FP(3).

Output circuit 410 transmits a stream of delta-encoded data 420 based on the intraframe IF and the delta-encoded data 106 stored in stream file 110 following the location indicated by the frame pointer FP (step 510). Output circuit 410 can transmit the stream of delta-encoded data 420 as RTP packets. Output circuit 410 can transmit the RTP packets using TCP/IP.

In embodiments where seek times ST are restricted to index times IT, output circuit 410 simply transmits the intraframe IF followed by the delta-encoded data 106 in stream file 110 following index time IT. For example, if the selected index pointer is IP(3), output circuit 410 transmits intraframe IF(3) followed by the delta-encoded data 106 in stream file 110 following the location indicated by frame pointer FP(3).

In embodiments where seek times ST are unrestricted, frame generation circuit 416 can first generate a frame for the seek time ST based on the intraframe IF and the delta-encoded data 106 in stream file 110 located between the index time IT and the seek time ST. Output circuit 410 then transmits the frame followed by the delta-encoded data 106 in stream file 110 following seek time ST. For example, if the seek time ST is 45 seconds, and the selected index time IT(3)=40 seconds, frame generation circuit 416 generates a frame based on intraframe IF(3) and the 5 seconds of delta-encoded data 106 in stream file 110 located between t=40 seconds and t=45 seconds. Output circuit 410 then transmits the frame followed by the delta-encoded data 106 in stream file 110 following t=45 seconds.

In embodiments where delta-encoded data 106 is stored in the form of RTP packets, output circuit 410 transmits the RTP packets. However, the recipient of the RTP packets may expect the timestamps and sequence numbers of the stream of delta-encoded data 420 transmitted by output circuit 410 to appear as a continuous RTP stream. That is, the recipient may expect the timestamps and sequence numbers of the RTP packets in stream 420 to increase in value despite whatever operations such as seek, fast-forward, rewind, and the like, are taking place at playback apparatus 400. Therefore output circuit 410 can include timestamp circuit 412 to modify the timestamps, and sequence circuit 414 to modify the sequence numbers, of the RTP packets before transmitting the RTP packets.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
   a seek circuit adapted to receive a seek time for a first stream of delta-encoded data stored in a stream file;
   a playback index circuit adapted to select an index time based on the seek time, and adapted to retrieve an index pointer associated with the index time from an index file, wherein the index file includes a plurality of the index times and index pointers each associated with one of the index times;
   a playback frame circuit adapted to select an intraframe based on the index pointer, and adapted to retrieve the intraframe, and a frame pointer associated with the intraframe, from a frame file, wherein the frame file includes a plurality of the intraframes and frame pointers; and
   an output circuit adapted to transmit a second stream of delta-encoded data based on the intraframe and the delta-encoded data stored in the stream file following a location indicated by the frame pointer.

2. The apparatus of claim 1, further comprising:
   a frame generation circuit adapted to generate a frame based on the intraframe and the delta-encoded data in the stream file located between the index time and the seek time;
   wherein the output circuit transmits the frame followed by the delta-encoded data in the stream file following the seek time.

3. The apparatus of claim 1:
   wherein the output circuit transmits the intraframe followed by the delta-encoded data in the stream file following the index time.

4. The apparatus of claim 1:
   wherein each stream of delta-encoded data includes a plurality of packets of video data.

5. The apparatus of claim 4, wherein the video data complies with at least one of:
   one or more of the Video Coding Experts Group (VCEG) standards; and
   one or more of the Moving Picture Experts Group (MPEG) standards.

6. The apparatus of claim 4:
   wherein each stream of delta-encoded data includes a plurality of real-time protocol (RTP) packets, wherein each RTP packet includes at least a portion of one of the packets of the video data; and
   wherein the output circuit transmits the RTP packets.

7. The apparatus of claim 6, wherein each of the RTP packets includes a timestamp and a sequence number, and wherein the output circuit comprises:
   a timestamp circuit adapted to modify the timestamps of the RTP packets following the location in the stream file indicated by the frame pointer before transmitting the RTP packets; and
   a sequence circuit adapted to modify the sequence numbers of the RTP packets following the location in the stream file indicated by the frame pointer before transmitting the RTP packets.

8. The apparatus of claim 6:
   wherein the output circuit transmits the RTP packets using transmission control protocol/Internet protocol (TCP/IP).

9. An apparatus comprising:
   a seek unit that receives a seek time for a first stream of delta-encoded data stored in a stream file;
   a playback index unit that selects an index time based on the seek time, and for retrieving an index pointer associated with the index time from an index file, wherein the index file includes a plurality of the index times and index pointers each associated with one of the index times;
   a playback frame unit that selects an intraframe based on the index pointer, and for retrieving the intraframe, and a frame pointer associated with the intraframe, from a frame file, wherein the frame file includes a plurality of the intraframes and frame pointers; and
   an output unit that transmits a second stream of delta-encoded data based on the intraframe and the delta-encoded data stored in the stream file following a location indicated by the frame pointer.

10. The apparatus of claim 9, further comprising:
    a frame generation unit that generates a frame based on the intraframe and the delta-encoded data in the stream file located between the index time and the seek time;
    wherein the output unit transmits the frame followed by the delta-encoded data in the stream file following the seek time.

11. The apparatus of claim 9:
    wherein the output unit transmits the intraframe followed by the delta-encoded data in the stream file following the index time.

12. The apparatus of claim 9:
    wherein each stream of delta-encoded data includes a plurality of packets of video data.

13. The apparatus of claim 12, wherein the video data complies with at least one of:
    one or more of the Video Coding Experts Group (VCEG) standards; and
    one or more of the Moving Picture Experts Group (MPEG) standards.

14. The apparatus of claim 12:
    wherein each stream of delta-encoded data includes a plurality of real-time protocol (RTP) packets, wherein each RTP packet includes at least a portion of one of the packets of the video data; and
    wherein the output unit transmits the RTP packets.

15. The apparatus of claim 14, wherein each of the RTP packets includes a timestamp and a sequence number, and wherein the output unit comprises:
    a timestamp unit that modifies the timestamps of the RTP packets following the location in the stream file indicated by the frame pointer before transmitting the RTP packets; and
    a sequence unit that modifies the sequence numbers of the RTP packets following the location in the stream file indicated by the frame pointer before transmitting the RTP packets.

16. The apparatus of claim 14:
    wherein the output unit transmits the RTP packets using transmission control protocol/Internet protocol (TCP/IP).

17. Non-transitory computer-readable media embodying instructions executable by a computer to perform a method comprising:
    receiving a seek time for a first stream of delta-encoded data stored in a stream file;
    selecting an index time based on the seek time;
    retrieving an index pointer associated with the index time from an index file, wherein the index file includes a plurality of the index times and index pointers each associated with one of the index times;

selecting an intraframe based on the index pointer;

retrieving the intraframe, and a frame pointer associated with the intraframe, from a frame file, wherein the frame file includes a plurality of the intraframes and frame pointers; and causing transmission of a second stream of delta-encoded data based on the intraframe and the delta-encoded data stored in the stream file following a location indicated by the frame pointer.

18. The non-transitory computer-readable media of claim 17, wherein the method further comprises:

generating a frame based on the intraframe and the delta-encoded data in the stream file located between the index time and the seek time; and causing transmission of the frame followed by the delta-encoded data in the stream file following the seek time.

19. The non-transitory computer-readable media of claim 17, wherein the method further comprises:

causing transmission of the intraframe followed by the delta-encoded data in the stream file following the index time.

20. The non-transitory computer-readable media of claim 17:

wherein each stream of delta-encoded data includes a plurality of packets of video data.

21. The non-transitory computer-readable media of claim 20, wherein the video data complies with at least one of:

one or more of the Video Coding Experts Group (VCEG) standards; and one or more of the Moving Picture Experts Group (MPEG) standards.

22. The non-transitory computer-readable media of claim 20:

wherein each stream of delta-encoded data includes a plurality of real-time protocol (RTP) packets, wherein each RTP packet includes at least a portion of one of the packets of the video data; and wherein the method further comprises causing transmission of the RTP packets.

23. The non-transitory computer-readable media of claim 22, wherein each of the RTP packets includes a timestamp and a sequence number, and wherein the method further comprises:

modifying the timestamps of the RTP packets following the location in the stream file indicated by the frame pointer before transmitting the RTP packets; and modifying the sequence numbers of the RTP packets following the location in the stream file indicated by the frame pointer before transmitting the RTP packets.

24. The non-transitory computer-readable media of claim 22, wherein the method further comprises:

causing transmission of the RTP packets using transmission control protocol/Internet protocol (TCP/IP).

* * * * *